Feb. 5, 1929.
C. A. BAKER
1,700,731
STUFFING BOX
Filed Dec. 31, 1926
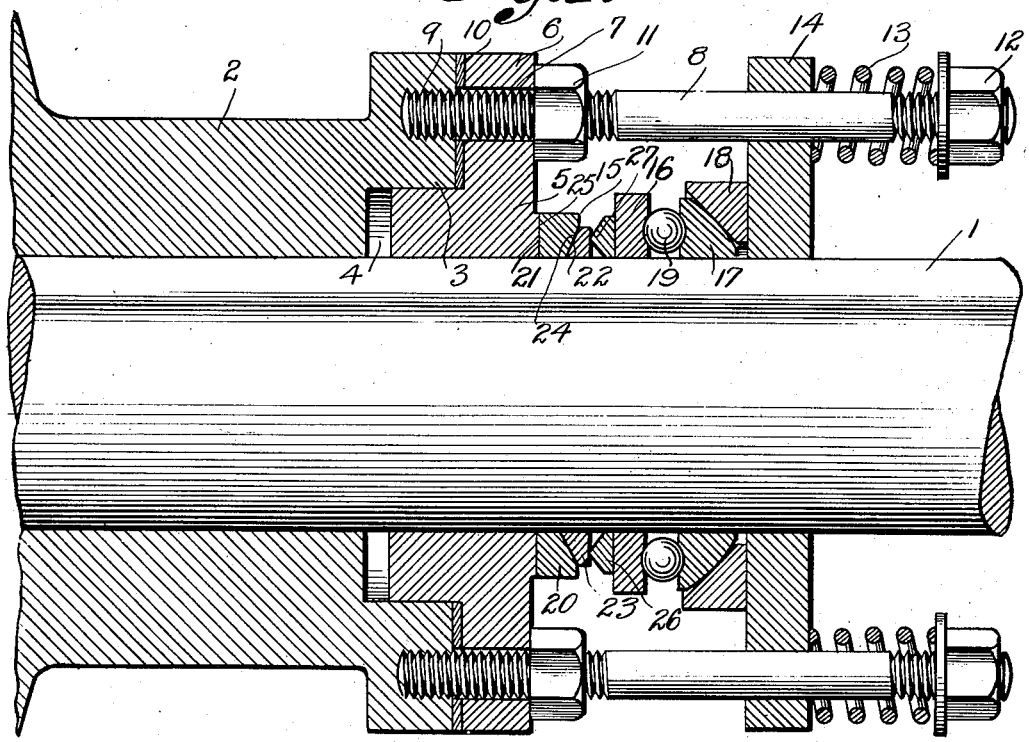
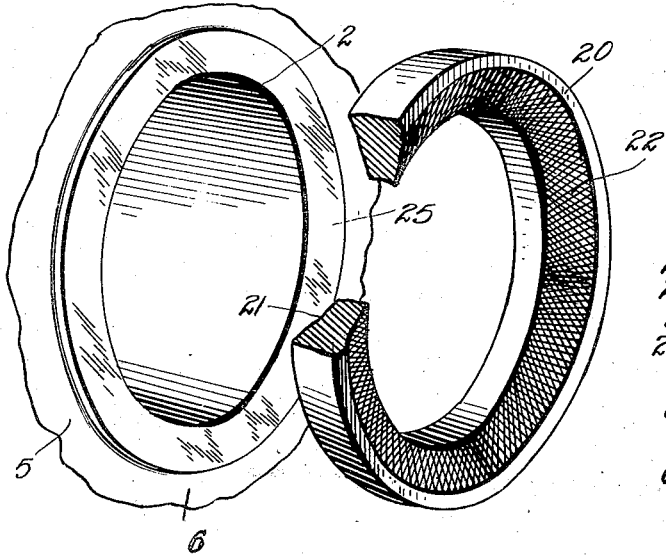
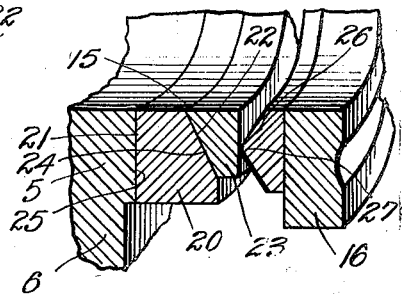
INVENTOR
Chester A. Baker.
BY
ATTORNEY Patented Feb. 5, 1929.

1,700,731

UNITED STATES PATENT OFFICE.

CHESTER A. BAKER, OF OMAHA, NEBRASKA, ASSIGNOR TO BAKER ICE MACHINE CO., INC., OF OMAHA, NEBRASKA, A CORPORATION OF NEBRASKA.

STUFFING BOX.

Application filed December 31, 1926. Serial No. 158,287.

My invention relates to seals for journalled shafts and more particularly to a device of that character for effectually restraining gases under severe conditions as in connection with ammonia compressors, where the problem of sealing the compressor-actuating shaft presents several troublesome aspects.

In the use of machines of this character it is especially desirable that leakage of gases from the compressor cylinder through the crank shaft case and around the shaft be prevented, but packing means that operate with reasonable effectiveness have usually required frequent repair, and generally are relatively inaccessible. It is the object of the present invention to provide a seal or packing of this character which is easily accessible and possesses the advantages heretofore mentioned. In accomplishing this object I have provided the improved details of structure hereinafter described and illustrated in the accompanying drawings, in which:

Fig. 1 is a longitudinal sectional view of my device applied to a journalled shaft.

Fig. 2 is an enlarged detail view of a metallic ring bearing element and of a fragment of a bearing gland, the two dissociated.

Fig. 3 is a fragmentary view of ring elements designed to rotate with the shaft, together with a portion of the gland.

Referring more in detail to the drawings:

1 designates a shaft and 2 a journal box supporting the shaft and having an annular shoulder 3 producing an interior recess 4 for the reception of a bearing gland 5 having a radial flange 6. Through openings 7 in the flange are projected double-ended bolts 8 that enter threaded opening 9 in the shoulder of the journal box for securing the gland to the journal box, the joint being provided with packing 10 compressed by the threading of lock nuts 11 on the bolts, the bolts having cap nuts 12 spaced by intermediate unthreaded body portions of the bolts from the lock nuts 11. Spiral springs 13 are mounted on the bolts adjacent the cap nuts, and bear against the cap nuts and a collar 14 rotatably mounted on the shaft 1, the collar being a tensioning block under the influence of the springs 13 for actuating the thrust bearing and shaft-sealing assembly generically designated 15 for functioning contact of sealing elements, which will be described, with the gland 5 and the shaft 1. A self-aligning thrust bearing rotatable on the shaft is provided comprising a ring race 16, a spherically shouldered race 17 engaged by a self-aligning ring 18, and ball bearings 19 supported by and rotatable in the races. It is designed that the race 16 shall rotate while the self-aligning bearing composed of race 17 and ring 18 is restrained by frictional contact with the collar 14.

The sealing elements are a metal packing ring 20 constructed of a substance susceptible of being ground to a smooth surface and provided with a smooth faced section 21, and having an inner radial diameter slightly greater than the shaft. The face opposite the ground face section is beveled and preferably knurled as disclosed in Fig. 2 and designated 22, for the reception of a distortable ring gasket 23, that may be of rubber and that is preferably provided with a wedge-like tapered face 24 substantially complementary to the beveled face 22 of the metal packing ring 20. The packing ring 20 presents the face of its section 21 to the gland 5 which is provided, at the bearing area, with a smooth surface indicated in the drawings as conferred on a shoulder 25 of the gland as preferably constructed. The relation of the shoulder 25 and the packing ring 20 is that of elements of a ground joint, whereby the ring is permitted to rotate in wiping contact with the gland.

A metal wedge washer 26 presents its base to the ring race 16 of the self-aligning thrust bearing, its cutting edge 27 bearing against the gasket 23. Under compulsion of the spring influence the thrust bearing tends to hold the metal packing ring 20 in close contact with the ground face of the gland, whereby gases are restrained from leakage through the joint.

The packing ring 20 has been referred to as having larger radial diameter than the shaft; and is, therefore, spaced from the shaft. The utility of such arrangement appears in the functioning of the wedging gasket. This gasket is compressed inwardly of the beveled face of the packing ring under compulsion of the wedge washer 26, influenced as described; and it both holds the packing ring against the bearing gland and, pressed by the wedge, stuffs the spacing area between the ring and the shaft.

My device being assembled as described, and parts adjusted for effective functioning, the springs, retained by the cap nuts of the bolts, compel the collar to actuate the thrust bearing to perform the double function of maintaining the wiping contact of the ground joint elements and of forcing the gasket inwardly of the spacing between the metal packing ring and the shaft. Any relaxation of wiping contact or of stuffing contact due to wear or other causes is retrieved by the tendency of the thrust bearing to compel the contacts. The device is positioned exterior to the crank case and to the journal box, and therefore is easily accessible. Parts may be replaced, and adjustments made, for example, fresh gaskets installed, the packing ring reground and the ground face of the gland reground, with a minimum expenditure of time and labor and therefore with a minimum of suspension of operation of the equipment to which it may be applied.

This result especially contrasts with situations presented by stuffing box and packing arrangements associated with outboard bearings constructed integral with the frame, and blind bearings for stuffing elements, where elaborate processes are required for dismantling for access to the stuffing elements.

While I have described a preferred construction, it is apparent that minor changes may be made, for example in the anchoring of the springs for tension against a thrust bearing, without departing from my invention.

What I claim and desire to secure by Letters Patent is:

1. In combination with a rotatable shaft and its journal box, a gland fixed to the box, a metallic packing ring rotatable with the shaft in contact with the gland and having a concave and roughened outer face, a compressible packing ring seated in said concave face of the metallic ring and rotatingly engaging the same, a wedge member rotatable with the shaft and engaging the compressible ring, a projector rotatable with the shaft and engaging the wedge member, and follower mechanism non-rotatable on the shaft yieldingly urging the projector to compress the compressible member.

2. In combination with a rotatable shaft and its journal box, a gland fixed to the box, a metallic packing ring rotatable with the shaft in contact with the gland and having a concave outer face, a compressible packing ring seated in said concave face and rotatable with the metallic ring, an expander rotatable with the shaft and engaging the compressible ring, a race ring rotatable with the shaft, follower mechanism non-rotatable on the shaft and including a race ring, antifriction members interposed between the race rings, a follower, and means yieldingly urging the follower toward the journal box to effect compression of the compressible ring.

3. In combination with a rotatable shaft and its journal box, a gland fixed to the box, a metallic packing ring rotatable with the shaft in contact with the gland and having a concave outer face, a compressible packing ring seated in said concave face and rotatable with the metallic ring, an expander rotatable with the shaft and engaging the compressible ring, a race ring rotatable with the shaft, a race ring non-rotatable on the shaft, antifriction members interposed between the race rings, an aligning ring non-rotatable on the shaft and engaging the non-rotatable race ring, a follower plate non-rotatable on the shaft and engaging the aligner, bolts on the box extended loosely through the gland and follower plate, nuts on the bolts engaging the gland to fix the same to the box, nuts on the bolts rearwardly of the follower plate, and springs interposed between the last-named nuts and the follower plate yieldingly urging the follower plate toward the journal box to effect compression of the compressible ring.

In testimony whereof I affix my signature.

CHESTER A. BAKER.